(12) United States Patent  (10) Patent No.: US 7,878,452 B2
Mastrolia  (45) Date of Patent: Feb. 1, 2011

(54) AIRCRAFT EJECTION SEAT WITH MOVEABLE HEADREST

(75) Inventor: Brad Mastrolia, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 12/708,404

(22) Filed: Feb. 18, 2010

(65) Prior Publication Data

US 2010/0155535 A1 Jun. 24, 2010

Related U.S. Application Data

(63) Continuation-in-part of application No. 12/040,095, filed on Feb. 29, 2008, now Pat. No. 7,699,265.

(60) Provisional application No. 60/893,039, filed on Mar. 5, 2007, provisional application No. 60/894,636, filed on Mar. 13, 2007.

(51) Int. Cl.
B64D 25/06 (2006.01)

(52) U.S. Cl. .......................... 244/122 AG; 244/122 A; 297/216.14

(58) Field of Classification Search ........... 244/122 AG, 244/122 A, 122 AB; 297/216.14, 216.12
See application file for complete search history.

(56) References Cited

U.S. PATENT DOCUMENTS 2,920,848 A 1/1960 Bohlin
3,334,847 A 8/1967 Axenborg
3,645,259 A 2/1972 Schulman
3,981,465 A 9/1976 Sinnett et al.
4,436,262 A 3/1984 Cummings
4,466,662 A 8/1984 McDonald et al.
4,667,901 A 5/1987 Herndon
4,899,961 A 2/1990 Herndon
5,039,035 A 8/1991 Fitzpatrick
6,315,245 B1 11/2001 Ruff
6,422,513 B1 7/2002 Lewis et al.
6,692,071 B2 2/2004 Fowler
6,938,953 B2 9/2005 Håland et al.
7,097,242 B2 8/2006 Farquhar et al.
7,604,080 B2 10/2009 Breed

FOREIGN PATENT DOCUMENTS

EP 1038770 A1 9/2000
GB 2373169 A 5/2002
JP 1-126296 A 10/1989

*Primary Examiner*—Christopher P Ellis
(74) *Attorney, Agent, or Firm*—Jerry J. Holden; John D. Titus

(57) ABSTRACT

An ejection seat includes a headrest that, upon initiation of the ejection seat, moves forward to support the pilot's head in a tilted-forward position. By holding the crewmember's head in a tilted-forward position, windblast forces are controlled to prevent the helmet from pulling upward and backward on the crewmember's head. The headrest may include a pair of struts that extend forward around the sides of the crewmember's helmet to support the crewmember's head against flailing from the windblast. A flexible panel extending between the struts and the headrest panel may also be included to further support the crewmember's head against windblast flailing.

16 Claims, 9 Drawing Sheets

AIRCRAFT EJECTION SEAT WITH MOVEABLE HEADREST

CROSS-REFERENCE TO RELATED APPLICATIONS

This application claims benefit of and is a continuation-in-part of U.S. application Ser. No. 12/040,095, filed Feb. 29, 2008 now U.S. Pat. No. 7,699,265, which claims benefit of U.S. provisional application No. 60/893,039, filed Mar. 5, 2007 and U.S. provisional application No. 60/894,636, filed Mar. 13, 2007.

BACKGROUND OF THE INVENTION

This invention relates to aircraft interior equipment, and more particularly, to aircraft ejection seats.

When a pilot or other aircraft occupant ejects from an aircraft moving at high speed, his or her body is subjected to various acceleration and aerodynamic conditions that if not properly controlled may lead to injury. One area of particular concern is the crewmember's head and neck. During the initial acceleration of the ejection seat, acceleration forces acting on the crewmember's head and helmet tend to pitch the crewmember's head forward and down. This effect is especially pronounced if the helmet is equipped with night vision and/or heads-up-display equipment mounted forward of the crewmember's face. Next, aerodynamic flow over the top of the helmet causes a large pressure drop to occur so that the normal pressure inside the helmet acts to pull the helmet upward, jerking the crewmember's head up and back from its previous tilted-forward position. After the seat has cleared the aircraft, aerodynamic forces acting on the helmet and ejection seat may interact to cause the crewmember's head to slam back against the headrest and/or flail in the windblast.

U.S. Pat. No. 3,645,259 to Schulman discloses an inflatable airbag positioned beneath the pilot's chin that inflates during ejection. This approach addresses the problem of the crewmember's head tilting forward upon initial acceleration but does not address the aerodynamic lift and flailing problems associated with high-speed ejection. U.S. Pat. No. 4,899,961 to Herndon discloses a headrest having inflatable lateral restraints. This approach addresses the problem of the crewmember's head flailing in the windblast but does not address the tilt-forward or aerodynamic lift issues. U.S. Pat. No. 4,436,262 to Cummings discloses a wind blast head protector in the form of a canopy that deploys over the top of the crewmember's helmet. This approach addresses the problem of the crewmember's helmet lifting off the crewmember's head and purports to address the issue of head flailing in the wind blast, but does not address the problem of the crewmember's head tilting forward and jerking back as acceleration forces give way to wind blast forces and may impede the crewmember's separation from the seat when the crewmember's parachute deploys.

SUMMARY OF THE INVENTION

The present invention overcomes the problems associated with the prior art by providing an ejection seat with a headrest that deploys to support the crewmember's head against acceleration and aerodynamic forces to prevent the pilot's head from being jerked upward or flailed by the acceleration and wind blast forces. According to an illustrative embodiment, the ejection seat comprises a headrest that, upon initiation of the ejection seat, moves forward to follow the crewmember's head as the head tilts forward and down under the acceleration of the ejection seat. In the illustrative embodiment, the headrest then locks in position to support the crewmember's head from above and behind in the acceleration-induced tilted-forward position. By holding the crewmember's head in a tilted-forward position, windblast forces are controlled to prevent the helmet from pulling upward and backward on the crewmember's head. Additionally, moving the headrest forward limits the distance the crewmember's head can move backwards in the windstream, thereby further controlling head impact loads. The headrest may include a pair of struts that extend forward around the sides of the crewmember's helmet to support the crewmember's head against flailing from the windblast. In the illustrative embodiment, one or more flexible strap or lanyard members extend between the struts and the headrest panel to pull the headrest panel into the deployed position and to further support the crewmember's head against windblast flailing.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
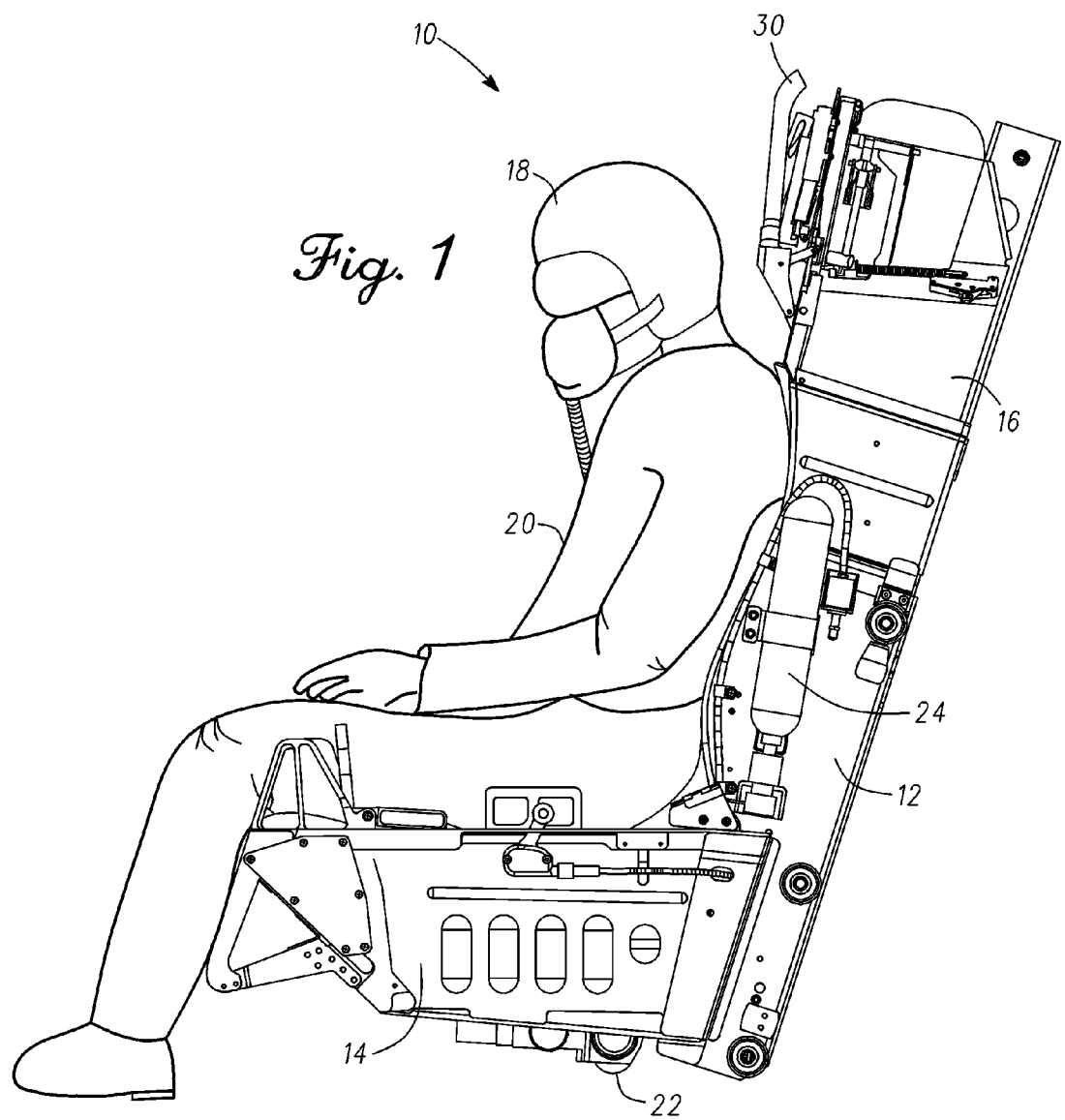
FIG. 1 is a side view of an illustrative embodiment of an ejection seat incorporating features of the present invention.

The drawing figures are intended to illustrate to the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
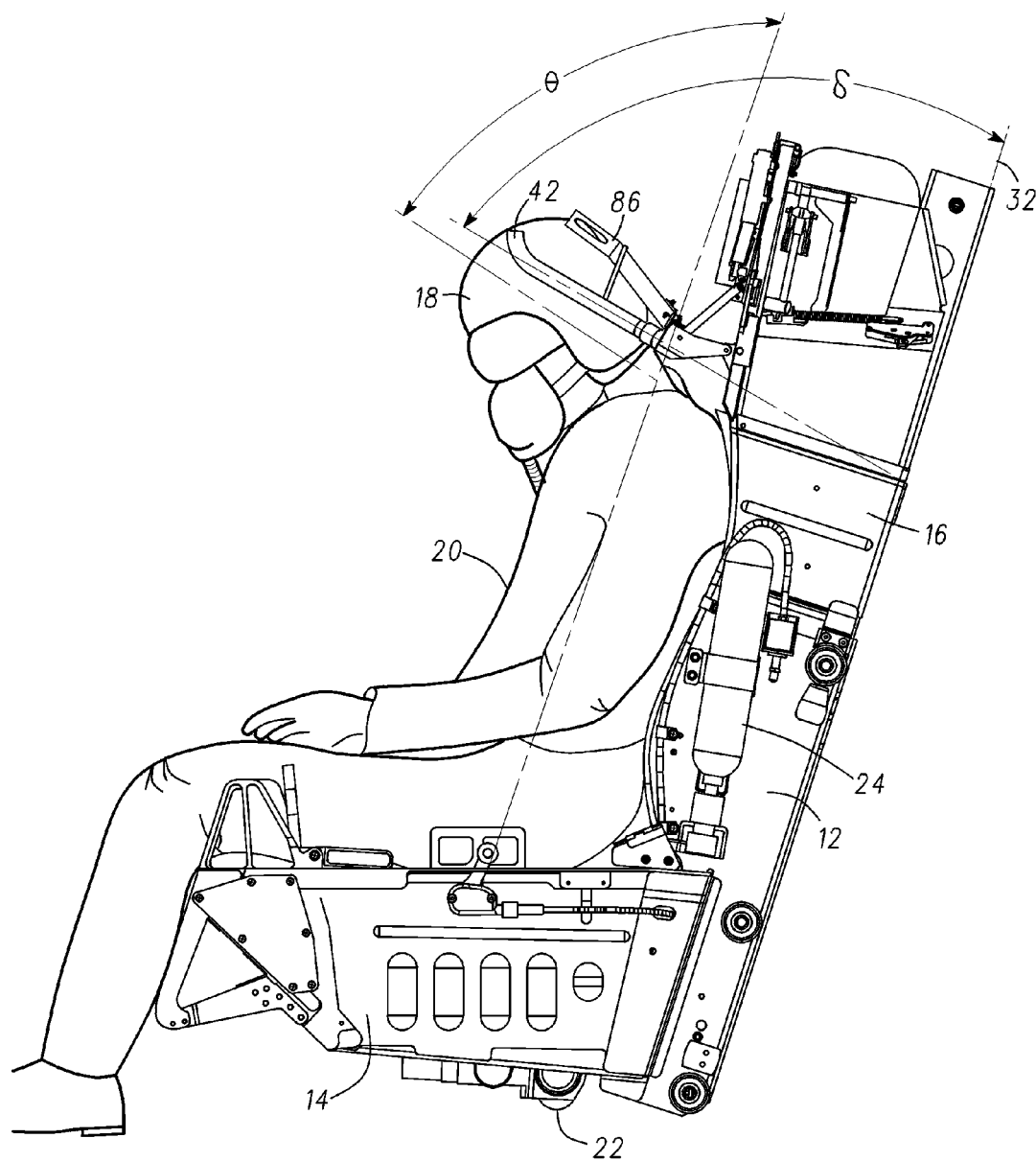
FIG. 2 is a side view of ejection seat of FIG. 1 with the headrest panel deployed.
Figure 3:
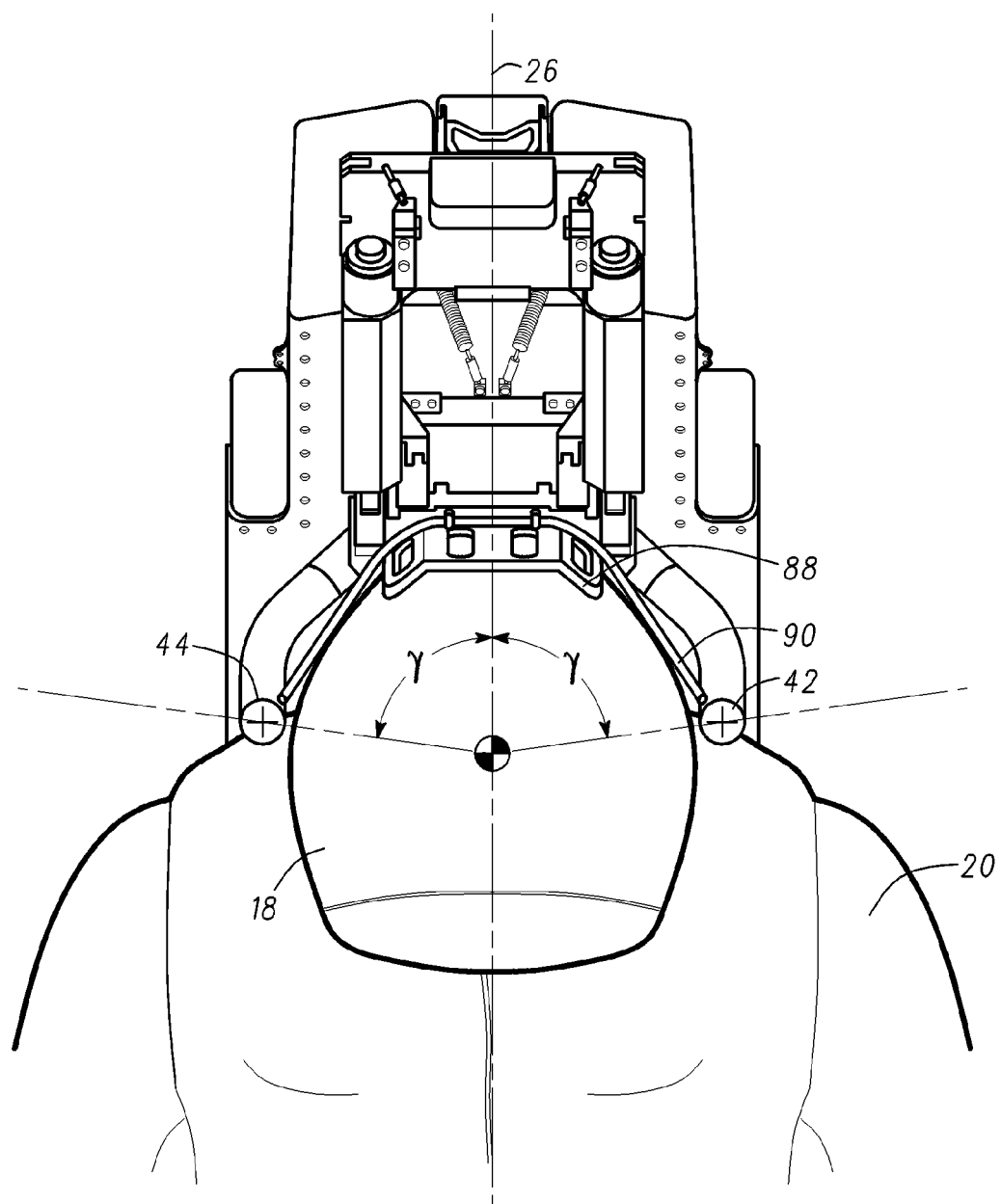
FIG. 3 is a front perspective view of the upper portion of the ejection seat of FIG. 1.

With references to FIGS. 1-3, an ejection seat 10 incorporating features of the present invention comprises a seat frame 12 consisting of a seat portion 14 and a seat back 16 adapted to support an aircraft occupant such as pilot 20. Ejection seat 10 is equipped with a propulsion subsystem typically consisting of a catapult and a rocket motor 22 for propelling the seat frame free of the aircraft in response to an eject signal. Ejection seat 10 is further equipped with a remote oxygen supply 24 inertial reels, snubbers (not shown) and other features associated with ejection seats well known in the art.

As with state of the art ejection seats, upon receipt of an eject signal (initiated by pilot command or based on an algorithm operating in one of the aircraft's computers) the ejection seat's propulsion subsystem is initiated to accelerate the ejection seat and its occupant quickly out of the aircraft. As noted hereinbefore, this initial acceleration acting on the mass of the crewmember's head and helmet cause the crewmember's head to tilt forward and downward. If the crewmember's head is not protected, subsequent exposure to the wind blast upon exiting the aircraft will cause the crewmember's head to be jerked upward with a force exceeding 400 pounds with the potential for causing serious injury to the crewmember. Various prior art approaches have attempted to limit the potential for injury caused by the crewmember's head tilting forward then jerking upward by attempting to prevent the crewmember's head from tilting forward in the first place, e.g., by inflating a pad underneath the crewmember's chin or attaching lanyards to the crewmember's helmet that retract during ejection, both with limited success.

What the inventor of the present invention determined was the aerodynamic forces tending to jerk the crewmember's helmet up could be more practically controlled by maintaining the crewmember's helmet in the tilted-forward position rather than trying to prevent the head tilt. Accordingly, the ejection seat 10 includes a movable headrest 30 that deploys from a stowed position as shown in FIG. 1 to a deployed position as shown in FIG. 2 to support the crewmember's head from above and behind in a tilted forward orientation at an angle $\theta$ preferably at least 30-40 degrees for a large occupant with a strong neck, between 40-50 degrees for a medium-sized occupant having average strength and from as much as 60 degrees measured relative to the occupant's torso up to and including supporting the crewmember with his/her head in a chin-to-chest position (70+ degrees) for a small occupant or an occupant with a weak neck. As can be seen in FIGS. 1 and 2, the crewmember's torso remains essentially in contact with seat back 16 of seat frame 12. The inertial reels and/or snubbers (not shown) may be employed to restrain the crewmember's torso against the seat back in a manner well-known in the art.

In the illustrative embodiment, movable headrest 30 comprises a pair of struts 42, 44 that are pivotably attached to seat back 16 of seat frame 12. Upon receipt of an eject signal, struts 42 and 44 pivot forward an angle $\delta$ at least 40 degrees or at least 50 degrees or between 40-100 degrees, preferably 50-90 degrees and most preferably about 70 degrees relative to the axis 32 of the seat back 16. As shown in FIG. 3, as struts 42, 44 pivot forward, they extend around the left and right sides of the crewmember's helmet 18 to cradle the crewmember's head against side loads. Struts 42, 44 extend around the crewmember's helmet at least $\pm\gamma$ where $\gamma$ is at least 30 degrees, but may be at least 45 degrees, at least 60 degrees or even 90 degrees measured relative to a front-to-rear axis 26 running through the center 28 of the crewmember's helmet 18.

Figure 4:
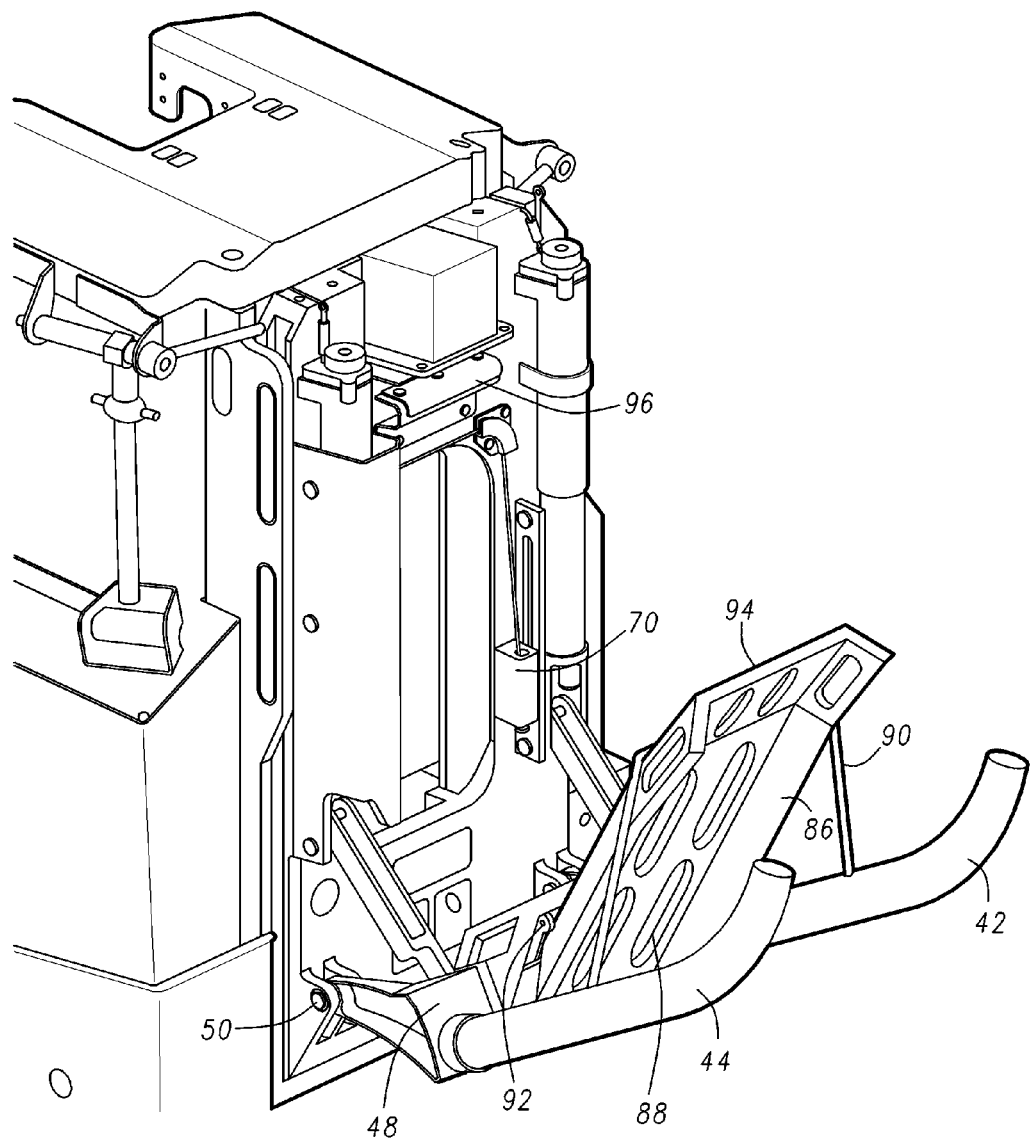
FIG. 4 is a top view of the upper portion of the ejection seat of FIG. 1.

With additional reference to FIG. 4, moveable headrest 30 further comprises a substantially rigid headrest panel 86. Headrest panel 86 includes a plurality of louvers 88 and is pivotably attached to seat back 16 of seat frame 12 in a manner more fully described hereinafter. A flexible strap 90 is attached between headrest panel 86 and struts 42, 44. As struts 42, 44 pivot forward, flexible strap 90 pulls headrest panel 86 forward between 40-100 degrees, preferably between 50-90 degrees and most preferably about 70 degrees relative to the longitudinal axis of the seat back to support the crewmember's head from above and behind against aerodynamic forces tending to jerk the crewmember's head upwards and backwards. As used herein, supporting the crewmember's head "from above and behind" means that at least a portion of the force applied against the crewmember's helmet can be resolved into a nonzero vector along the line of action of the rocket motor accelerating ejection seat 10 out of the aircraft.

Flexible strap 90 is preferably formed of a lightweight synthetic fabric such as nylon, polyester, aramid fibers or other fiber material and may be formed in an open weave net, a single strap, cord, or a plurality of straps of sufficient strength to deploy headrest panel 86, while at the same time presenting minimal frontal area. In the illustrative embodiment, the frontal area presented by the combination of struts 42, 44 headrest panel 86 and strap 90 is preferably at least 20% open space, and may include configurations having at least 30%, at least 40% or even up to and exceeding 50% open space as compared to the total area between struts 42, 44 if the headrest were a solid surface. The minimal frontal area of flexible strap 90 together with the louvers 88 formed in headrest panel 86 prevent pressure buildup between the crewmember's helmet and the headrest which would otherwise potentially cause helmet flailing.

Figure 5:
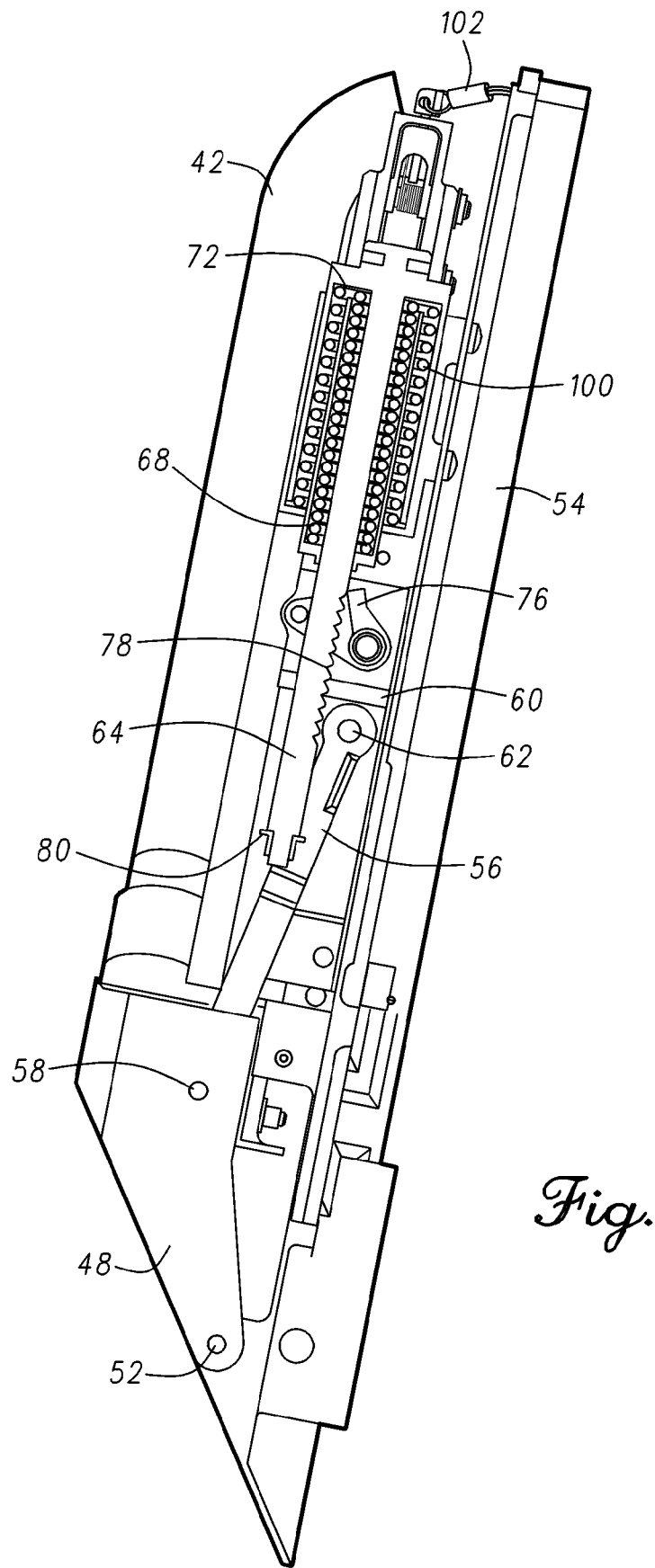
FIG. 5 is a side view of the headrest deployment mechanism of the illustrative embodiment of FIG. 4 with the headrest panel in the stowed position.
Figure 6:
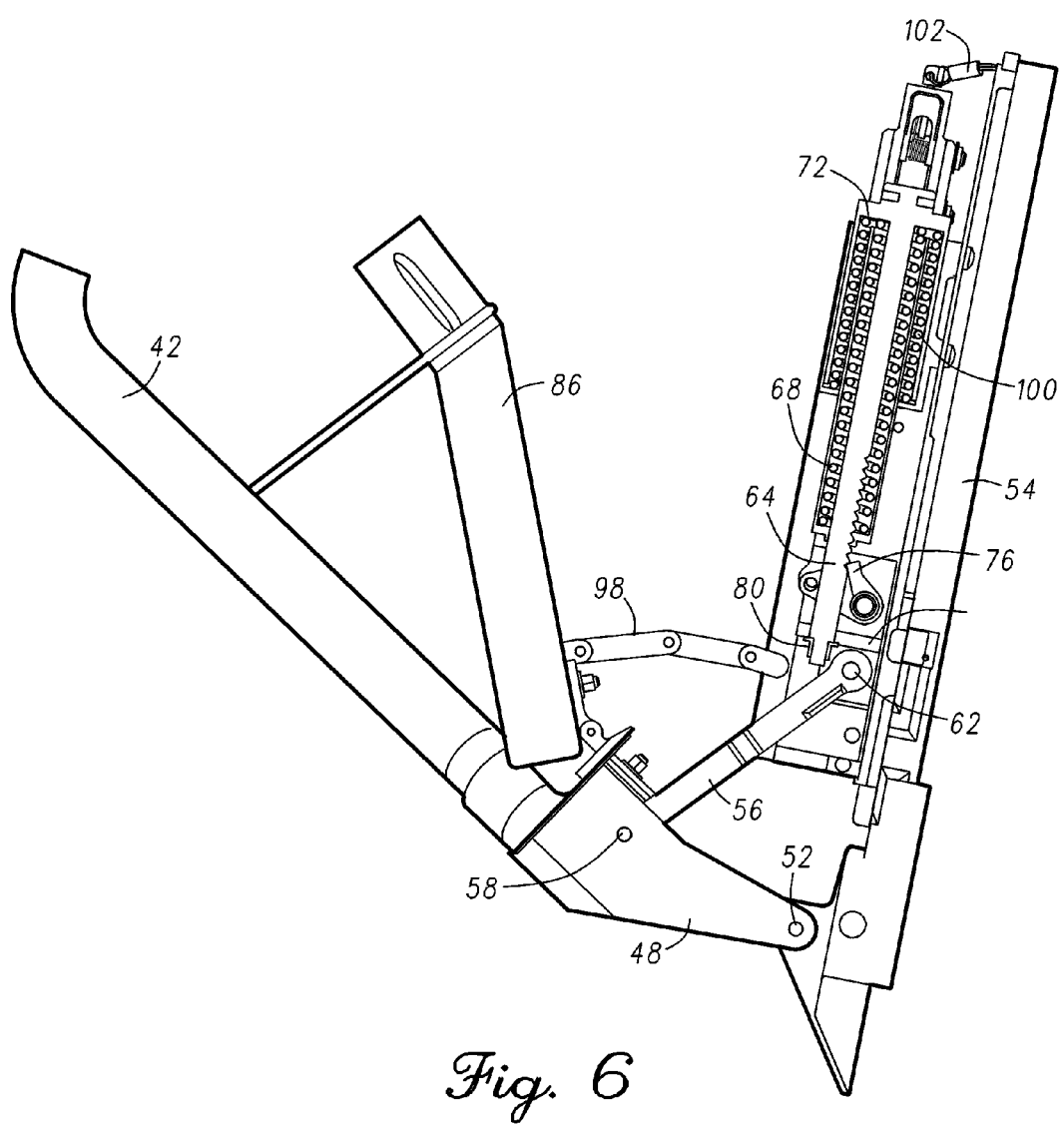
FIG. 6 is a side view of the headrest mechanism of FIG. 5 with the headrest panel in the deployed position.

With additional reference to FIGS. 5-6, each of struts 42, 44 is attached to a strut support 48. Strut support 48 is pivotably attached by pivots 50, 52 to a frame 54 mounted to seat back 16 of ejection seat 10. Strut support 48 is pivotably attached to one end of toggle link 56 by pivot 58. The other end of toggle link 56 is pivotably connected to a slider 60 by means of pivot 62. Strut support 48, toggle link 56 and slider 60 form a toggle linkage that is slightly under center when strut 44 is in its stowed position as shown in FIG. 5.

As can be determined from an inspection of FIGS. 5 and 6, when slider 60 is urged downward along rack 64, the toggle linkage moves from the slightly under center position as shown in FIG. 5 to a substantially under center position as shown in FIG. 6. This action to moves strut 44 from its stowed position to its deployed position. Strut 44 is maintained in its stowed position by a release pin 70 (FIG. 4) which holds slider 60 in position against the substantial downward force of deployment spring 68 which acts between slider 60 and spring seat 72 formed at the upper end of rack 64. When release pin 70 is withdrawn in response to an eject signal, deployment spring 68 forces slider 60 downward along rack 64 thereby moving the toggle linkage formed by strut support 48 and toggle link 56 into the substantially over center position as shown in FIG. 6. Because the linkage is spring-loaded rather than positively displaced, the headrest panel 86 follows the occupant's head down and forward during the ejection event rather than forcing it into a predetermined position. Thus, for large occupants with strong necks, the headrest panel 86 may deploy to support the occupant's neck at an angle $\theta$ as little as 30-40 degrees, while for small occupants with weaker necks, the headrest panel 86 may deploy to support the occupant's neck at an angle $\theta$ as much as 60-70 degrees relative to the torso. In essence, the headrest automatically adapts to the occupant's size and strength without employing weight sensors, range sensors, pattern recognition sensors, or other cumbersome and potentially unreliable direct sensors.

As the headrest panel 86 follows the occupant's head down and forward, a pawl 76 mounted on slider 60 engages a series of ratchet teeth 78 formed on rack 64 to prevent strut 44 from retracting once deployed. Deployment spring 68 is sized to ensure moveable headrest 30 moves from the stowed position as shown in FIG. 5 to the deployed position as shown in FIG. 6 in less than 800 milliseconds, preferably less than 400 milliseconds and most preferably in less than 200 milliseconds with sufficient force to overcome windblast forces in the aircraft after separation of the canopy.

With reference again to FIG. 4 headrest panel 86 is pivotably attached to strut support 48 by hinge 92. This creates a second toggle linkage consisting of headrest panel 86 and strut support 48. This second toggle linkage enables headrest panel 86 to be securely stowed in the undeployed condition with the upper edge 94 of headrest panel sliding under hook 96 as strut support 48 rotates to the stowed position. As strut support 48 rotates toward the deployed position, the upper edge 94 of headrest panel 86 slides out from under hook 96 freeing headrest panel 86. Headrest panel 86 is then pulled forward by flexible strap 90 as described above. With additional reference to FIG. 6, headrest panel 86 may be equipped with an over-travel limiting linkage such as linkage 98 which prevents headrest panel 86 from extending beyond a predetermined distance, for example in the illustrative embodiment, headrest panel 86 is constrained so that it does not extend further than 70 degrees relative to axis 32 of seat back 16. This prevents headrest panel 86 from potentially hooking under the helmet of a particularly small occupant.

Figure 7:
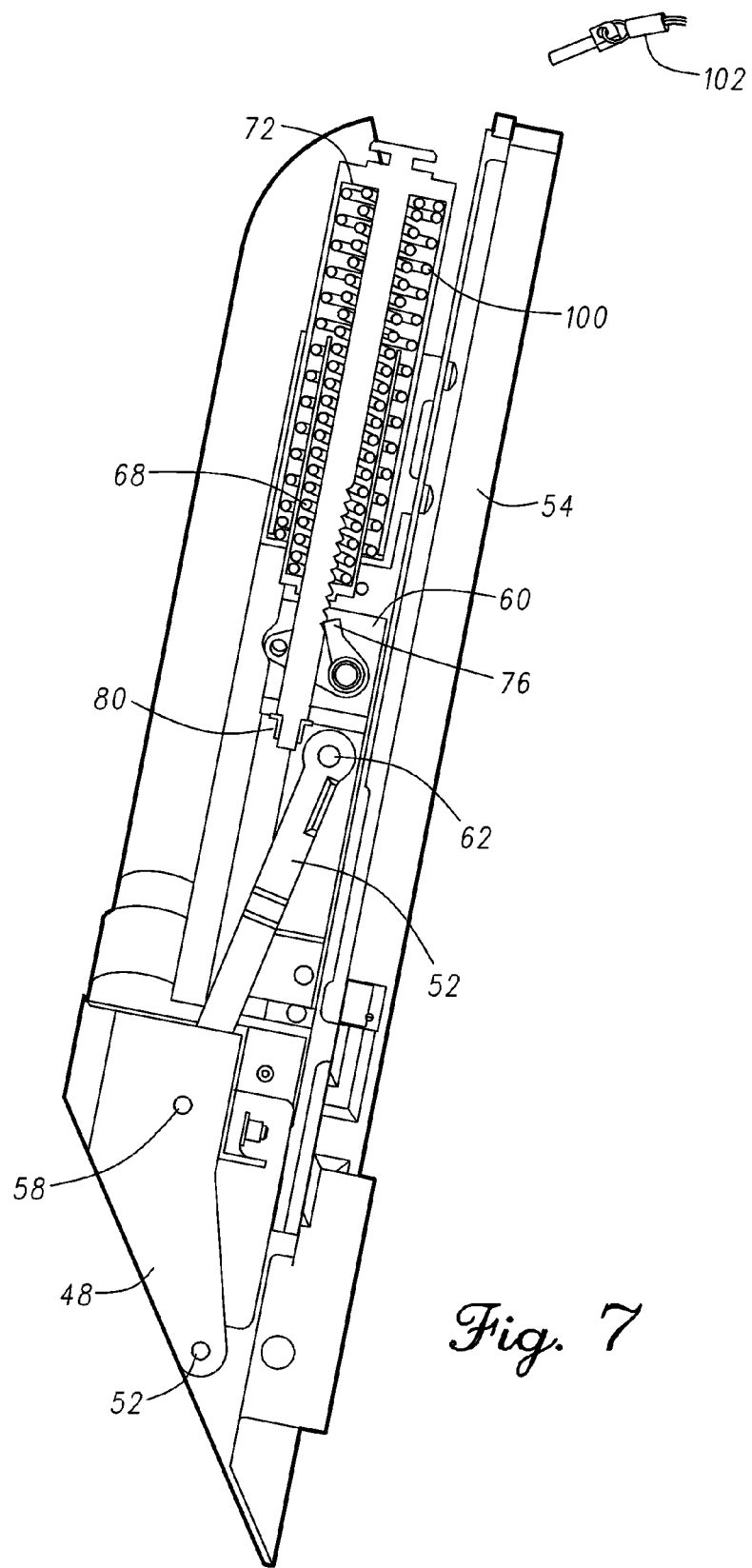
FIG. 7 is a side view of the headrest mechanism of FIG. 5 with the headrest panel in the retracted position.

With additional reference to FIG. 7, movable headrest 30 further comprises a retraction spring 100 which acts on spring seat 72 formed at the upper end of rack 64. Rack 64 is maintained in its operational position by a release pin 102 which holds rack 64 in position against the substantial upward force of retraction spring 102. When release pin 102 is withdrawn, retraction spring 100 forces rack 64 upward. Because slider 60 is held against the end of rack 64 by stop 80, upward movement of rack 64 causes slider also to move upward thereby moving movable headrest 30 into a retracted position with headrest panel 86 and struts 42, 44 retracted against seatback 16.

Figure 8:
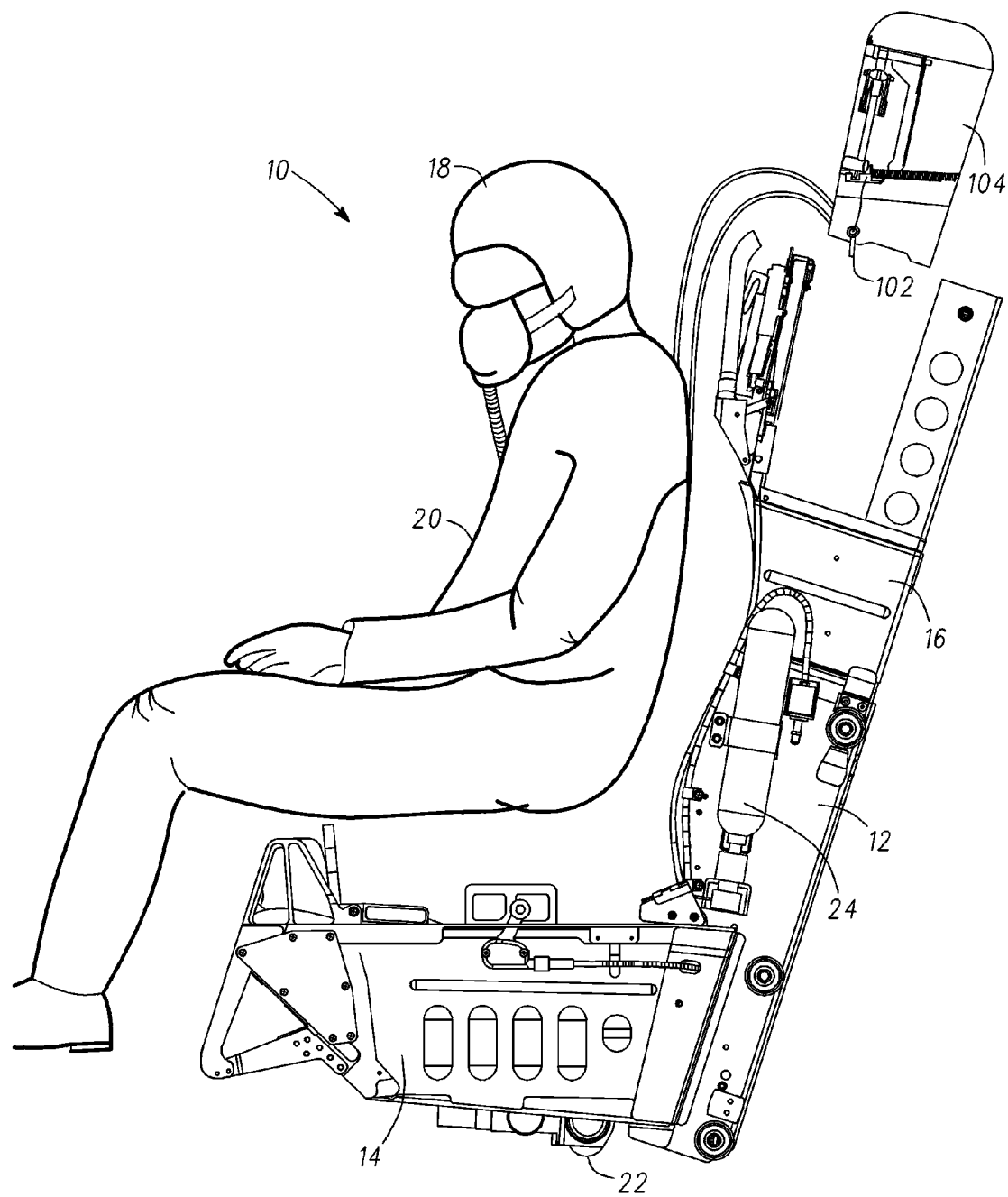
FIG. 8 is a side view of the ejection seat of FIG. 1 with the headrest panel retracted and the occupant separating from the ejection seat.
Figure 9:
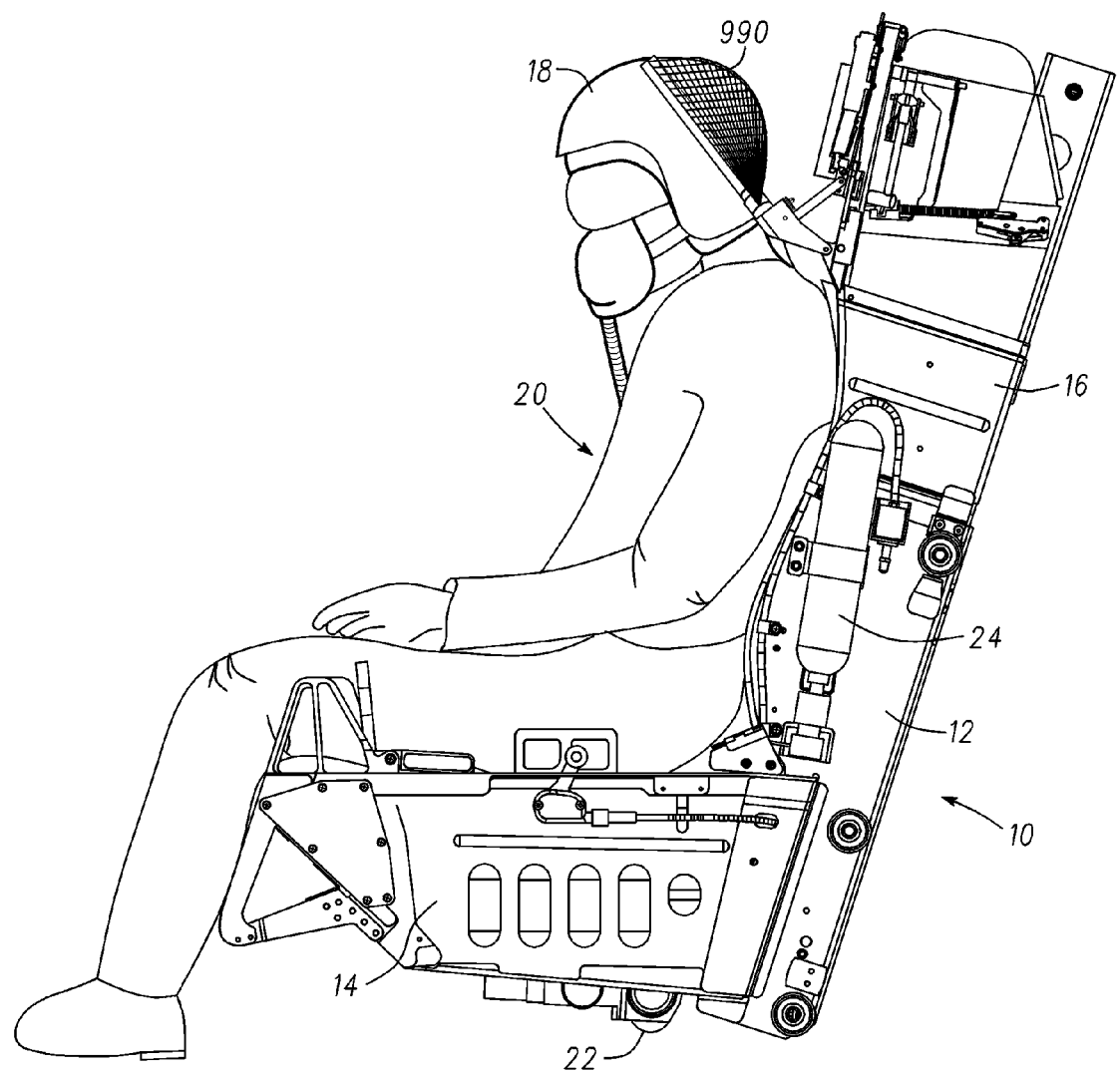
FIG. 9 is a side view of an afternative embodiment of an ejection seat having a fully flexible headrest panel.

In the illustrative embodiment, release pin 102 is withdrawn by the action of parachute pack 104 separating from ejection seat 10, however, any signal indicative that it is safe to release the crewmember's head from the tilted forward position may be employed, for example in place of pin 102, use of a frangible fastener initiated by firing of the parachute gun, initiation of the pitch and/or yaw motors or other signals may be employed without departing from the scope of the invention as claimed. Retraction spring 100 is sized to ensure movable headrest moves from the deployed position as shown in FIG. 6 to the retracted position as shown in FIG. 7 in less than 800 milliseconds, preferably less than 400 milliseconds and most preferably in less than 200 milliseconds. Rapid movement of the moveable headrest 30 from the deployed position as shown in FIG. 6 to the retracted position as shown in FIG. 8 minimizes the possibility that the crewmember's separation from ejection seat 10 would be obstructed in anyway by movable headrest 30. The mechanism that deploys and retracts strut 42 is substantially the same as the mechanism that deploys and retracts strut 44 and therefore will not be discussed in detail herein.

Although certain illustrative embodiments and methods have been disclosed herein, it will be apparent from the foregoing disclosure to those skilled in the art that variations and modifications of such embodiments and methods may be made without departing from the scope of the invention as claimed. For example, although the means for deploying the movable headrest from the stowed position to the deployed position shown in the illustrative embodiments comprised an elastic member such as a compression spring, other means of deploying the movable headrest including pneumatic, hydropneumatic or electric solenoid, stepper motor, pyrotechnic actuator motor with slip clutch, etc. are considered to be equivalent means for deploying the headrest and therefore considered with in the scope of the invention. Additionally, although in the illustrative embodiment the headrest panel pivots forward, any movable headrest that deploys in response to the eject signal to retain the crewmember's head from a base and behind in a tilted-forward position, such as a linear actuator or cylinder extending forward from the back portion of the seat frame forward of the seat cushion is considered an equivalent means and therefore within the scope of the invention. Similarly, although in the illustrative embodiment of FIGS. 1-8, the struts are attached to a rigid headrest panel, a fully flexible panel 990 is considered to be an equivalent headrest and therefore is considered within the scope of the invention. Finally, although the means for locking the movable headrest in its deployed position shown in the illustrative embodiment comprised a ratchet and pawl, other means for preventing the headrest from retracting towards its stowed position such as ball detents, over center links, self-locking gear ratios, torque-limiting clutches, stepper motors, etc. are considered to be equivalent means and therefore within the scope of the present invention. Accordingly, it is intended that the invention shall be limited only to the extent required by the appended claims and the rules and principles of applicable law.

The invention claimed is:

1. An ejection seat for an aircraft comprising:
a seat frame for supporting an aircraft occupant, said seat frame including a seat portion and a back portion;
a propulsion subsystem for propelling the seat frame free of the aircraft in response to an eject signal; and
a moveable headrest attached to the back portion of said seat frame, said moveable headrest comprising a headrest panel that, in response to said eject signal, extends forward from a stowed position rearward of the occupant's head, to a deployed position in contact with the occupant's head to support the rear of the occupant's head in a position tilted forward at least 35 degrees relative to the occupant's torso.

2. The ejection seat of claim 1, wherein:
the headrest panel supports the occupant's head in a position tilted forward at least 45 degrees relative to the occupant's torso.

3. The ejection seat of claim 1, wherein:
the headrest panel supports the occupant's head in a position tilted forward with the occupant's head chin-to-chest.

4. The ejection seat of claim 1, wherein:
the moveable headrest includes deployable side members that extend forward of the headrest panel to wrap around the occupant's head at least +/−30 degrees to support the occupant's head against lateral forces.

5. The ejection seat of claim 1, wherein:
the moveable headrest includes deployable side members that extend forward of the headrest panel to wrap around the occupant's head at least +/−45 degrees to support the occupant's head against lateral forces.

6. The ejection seat of claim 1, wherein:
the moveable headrest includes deployable side members that extend forward of the headrest panel to wrap around the occupant's head at least +/−60 degrees to support the occupant's head against lateral forces.

7. The ejection seat of claim 1, wherein:
the moveable headrest further comprises a plurality of struts and at least one flexible coupling, each of the plurality of struts extending generally vertically upward from a pivot attached to the back portion of the seat frame, the at least one flexible coupling attaching at least one of the plurality of struts to the headrest panel, the plurality of struts in the deployed position pivoting forward to extend around the occupant's head at least +/−30 degrees, whereby as the plurality of struts pivot forward, the flexible coupling acts to move the headrest panel from the stowed position to the deployed position.

8. The ejection seat of claim 7, wherein:

the moveable headrest includes deployable side members that extend forward of the headrest panel to wrap around the occupant's head at least +/−60 degrees to support the occupant's head against lateral forces.

9. An ejection seat for an aircraft comprising:

a seat frame for supporting an aircraft occupant, said seat frame including a seat portion and a back portion;

a propulsion subsystem for propelling the seat frame free of the aircraft in response to an eject signal; and a moveable head support attached to the back portion of said seat frame, said moveable head support comprising a central member that, in response to said eject signal, extends forward from a stowed position rearward of the occupant's head, to a deployed position pressing against the occupant's head in a tilted-forward position said head support further includes deployable side members that extend forward of the central member to wrap around the occupant's head at a predetermined angle.

10. The ejection seat of claim 9, wherein:

the head support supports the occupant's head in a position tilted forward at an angle θ at least 30 degrees relative to the occupant's torso.

11. The ejection seat of claim 9, wherein:

the head support supports the occupant's head in a position tilted forward with the occupant's head chin-to-chest.

12. The ejection seat of claim 9, wherein:

said predetermined angle is set to at least +/−30 degrees to support the occupant's head against lateral forces.

13. The ejection seat of claim 9, wherein:

said predetermined angle is set to at least +/−45 degrees to support the occupant's head against lateral forces.

14. The ejection seat of claim 9, wherein:

said predetermined angle is set to at least +/−60 degrees to support the occupant's head against lateral forces.

15. The ejection seat of claim 9, wherein the central member is rigid.

16. The ejection seat of claim 9, wherein the central member is fully flexible.

* * * * *